(12) United States Patent
Pohjoisvirta et al.

(10) Patent No.: US 9,936,015 B2
(45) Date of Patent: Apr. 3, 2018

(54) METHOD FOR BUILDING UP A CONTENT MANAGEMENT SYSTEM

(71) Applicant: M-Files Oy, Tampere (FI)

(72) Inventors: Lassi Pohjoisvirta, Tampere (FI); Juha Lepola, Tampere (FI); Jari Paija, Urjala (FI)

(73) Assignee: M-FILES OY, Tampere (FI)

( * ) Notice: Subject to any disclaimer, the term of this patent is extended or adjusted under 35 U.S.C. 154(b) by 158 days.

(21) Appl. No.: 14/568,437

(22) Filed: Dec. 12, 2014

(65) Prior Publication Data

US 2016/0173590 A1   Jun. 16, 2016

(51) Int. Cl.
  *G06F 15/16*   (2006.01)
  *H04L 29/08*   (2006.01)
  *G06F 17/30*   (2006.01)

(52) U.S. Cl.
  CPC .... *H04L 67/1095* (2013.01); *G06F 17/30079* (2013.01); *G06F 17/30212* (2013.01); *G06F 17/30215* (2013.01); *H04L 67/1097* (2013.01); *H04L 67/2823* (2013.01)

(58) Field of Classification Search
  None
  See application file for complete search history.

(56) References Cited

U.S. PATENT DOCUMENTS

| | | | | |
|---|---|---|---|---|
| 2002/0188706 A1* | 12/2002 | Richards | ................ | H04L 29/06 709/223 |
| 2007/0233828 A1* | 10/2007 | Gilbert | ................ | G06F 11/1458 709/223 |
| 2009/0222498 A1* | 9/2009 | Lu | ................ | G06F 17/30067 |
| 2010/0192187 A1* | 7/2010 | Toebes | ................ | H04N 7/17318 725/87 |
| 2011/0196828 A1* | 8/2011 | Drobychev | ................ | G06F 17/30581 707/622 |
| 2011/0282834 A1* | 11/2011 | Desai | ................ | G06F 11/2097 707/611 |
| 2011/0307514 A1* | 12/2011 | Goodman | ................ | G06F 17/30575 707/770 |
| 2012/0158659 A1* | 6/2012 | Marathe | ................ | G06F 17/30997 707/639 |
| 2012/0233118 A1* | 9/2012 | Holt | ................ | H04L 67/06 707/620 |
| 2014/0006351 A1* | 1/2014 | Laitkorpi | ................ | G06F 17/30581 707/634 |
| 2014/0101184 A1* | 4/2014 | Palthepu | ................ | G06F 17/30194 707/758 |
| 2014/0188805 A1* | 7/2014 | Vijayan | ................ | G06F 11/1453 707/646 |

(Continued)

*Primary Examiner* — Phyllis A Book
(74) *Attorney, Agent, or Firm* — Ware, Fressola, Maguire & Barber LLP

(57) ABSTRACT

The invention relates to a content management system and a method therein. The content management system comprises at least a first vault in a server and a migration tool. The method comprises receiving by the migration tool a content packet from a third-party application; receiving by the migration tool information on a metadata structure used in the first vault; generating a replication packet by adapting content from the content packet according to the information on the metadata structure; storing the replication packet in the server; and replicating the objects in the replication packet to the first vault.

10 Claims, 4 Drawing Sheets

(56) References Cited

U.S. PATENT DOCUMENTS

| | | | |
|---|---|---|---|
| 2014/0379640 A1* | 12/2014 | Romatoski | G06F 17/30575 707/610 |
| 2016/0117318 A1* | 4/2016 | Helland | G06F 17/303 707/634 |
| 2016/0132400 A1* | 5/2016 | Pawar | G06F 11/1451 707/679 |

* cited by examiner

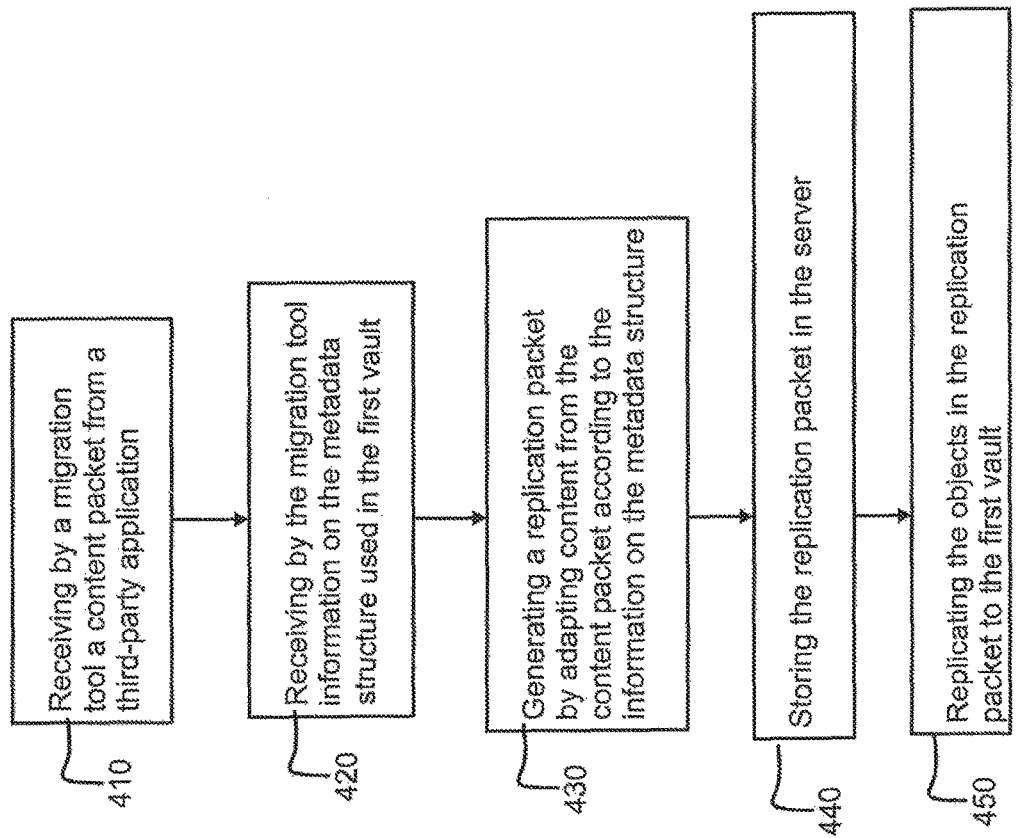

METHOD FOR BUILDING UP A CONTENT MANAGEMENT SYSTEM

FIELD OF THE INVENTION

The present invention relates to building up a content management system. In particular, the present invention relates to building up a content management system that is dynamic and comprises data as virtual objects.

BACKGROUND OF THE INVENTION

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

SUMMARY

Now there has been invented an improved method and technical equipment implementing the method, by which content management systems may be built up. Various aspects of the invention include a content management system, a method, an apparatus and a computer readable medium comprising a computer program stored therein, which are characterized by what is stated in the independent claims. Various embodiments of the invention are disclosed in the dependent claims.

According to a first aspect, there is provided a method for a content management system, the content management system comprising at least a first vault in a server and a migration tool, the method comprising: receiving by the migration tool a content packet from a third-party application; receiving by the migration tool information on a metadata structure used in the first vault; generating a replication packet by adapting content from the content packet according to the information on the metadata structure; storing the replication packet in the server; and replicating the objects in the replication packet to the first vault.

According to a second aspect, there is provided an apparatus comprising at least one processor, memory including computer program code, the memory and the computer program code configured to, with the at least one processor, cause the apparatus to perform at least the following: receive a content packet from a third-party application; receive information on a metadata structure used in the first vault; generate a replication packet by adapting content from the content packet according to the information on the metadata structure; store the replication packet in the server; and replicate the objects in the replication packet to the first vault.

According to a third aspect, there is provided a computer program product embodied on a non-transitory computer readable medium, comprising computer program code configured to, when executed on at least one processor, cause an apparatus or a system to: receive by the migration tool a content packet from a third-party application; receive by the migration tool information on a metadata structure used in the first vault; generate a replication packet by adapting content from the content packet according to the information on the metadata structure; store the replication packet in the server; and replicate the objects in the replication packet to the first vault.

According to a fourth aspect, there is provided a content management system comprising a first vault in a server and a migration tool, the server comprising at least one processor and memory including computer program code, the memory and the computer program code configured to, with the at least one processor, cause the system to perform at least the following: receiving by the migration tool a content packet from a third-party application; receiving by the migration tool information on a metadata structure used in the first vault; generating a replication packet by adapting content from the content packet according to the information on the metadata structure; storing the replication packet in the server; and replicating the objects in the replication packet to the first vault.

According to an embodiment, the replication packet is a second replication packet, wherein the method comprises receiving a first replication packet for replicating a metadata structure for the first vault.

According to an embodiment, the information on the metadata structure relates to the metadata structure being replicated by the first replication packet.

According to an embodiment, an internal data model relating to the received information on the metadata structure is generated, which internal data model is used for adapting the content.

According to an embodiment, the server is a cloud server.

DESCRIPTION OF THE DRAWINGS

In the following, various embodiments of the invention will be described in more detail with reference to the appended drawings, in which
FIG. 4 is a flowchart illustrating a method according to an embodiment.

DESCRIPTION OF EXAMPLE EMBODIMENTS

In the following, several embodiments of the invention will be described in the context of content management systems, and particularly in the context of building a content management system. It is to be noted, however, that the different embodiments may be applied when a content management system is updated.

In the following, term "content management system" refers to a system that is based on a "data management solution" which is an application platform, such as applicant's M-files® solution. The application platform provides basis for several enterprise content management (ECM) applications, for example, a quality management system (QMS) application, a document management system (DMS) application, a customer relationship management system (CRM) application. Term "content management application" is a general term covering also QMS application, CRM application and DMS application.

The present embodiments relate to a solution for building up a content management system. By the present solution, the content management application and the needed metadata structure in a first replication packet are packetized, and provided to a client to be stored on a server. The content for the content management application is imported as a second replication packet to the server. In the following embodiments, the server comprises one or more client vaults which may comprise a version of a metadata structure being utilized by the content management system. Alternatively, the client vault may be empty, and a metadata structure is configured from the beginning.

The metadata structure is used for creating stronger semantics and business logic to metadata. The metadata structure may define property definitions for the metadata, classes (templates) available for the metadata, business process rules, user interface views etc. The metadata structure may also have an application level defining how to use/modify the name-value pairs in the metadata.

Figure 1:
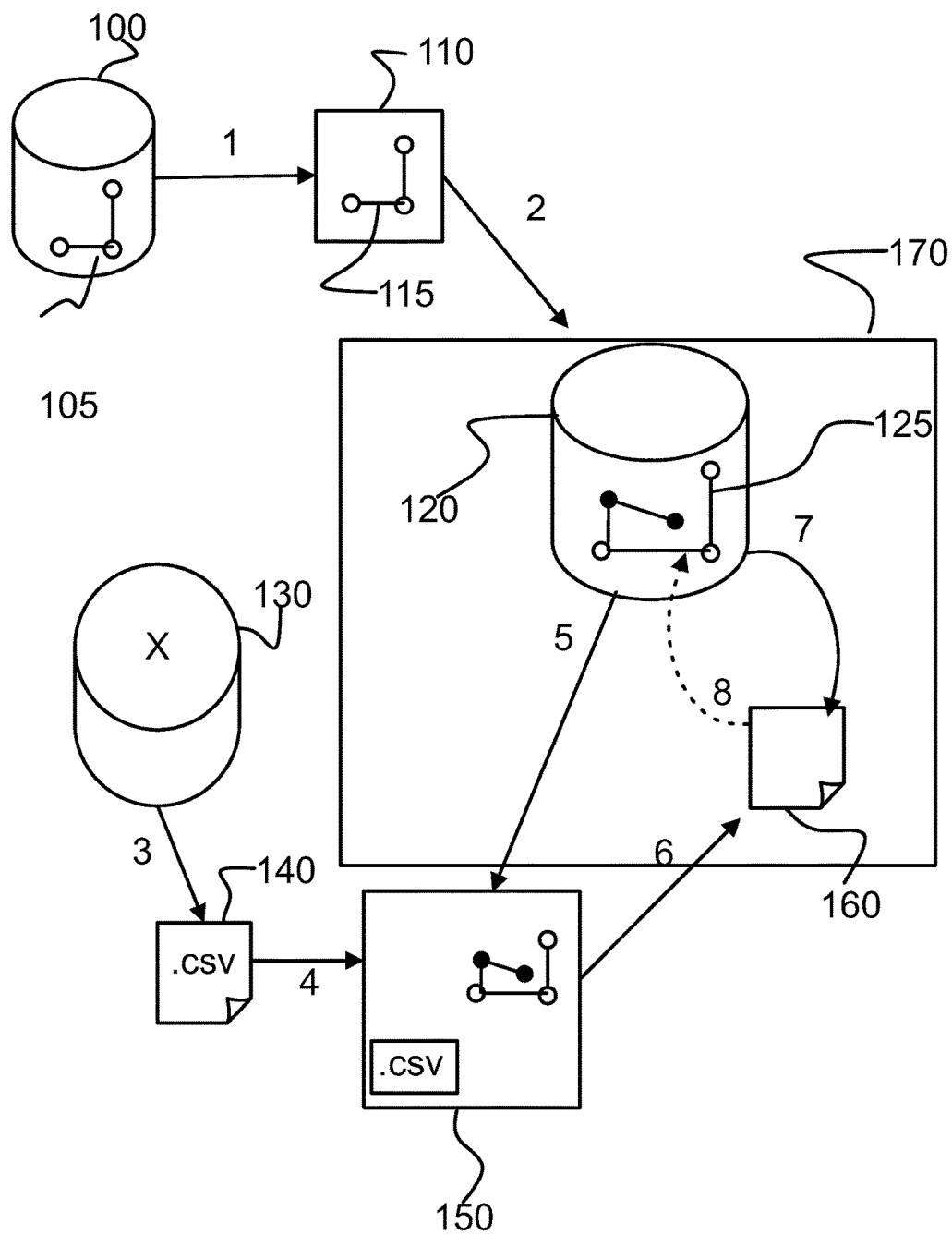
FIG. 1 shows an embodiment of a system.

FIG. 1 illustrates an embodiment of overall architecture of a system.

Figure 2B:
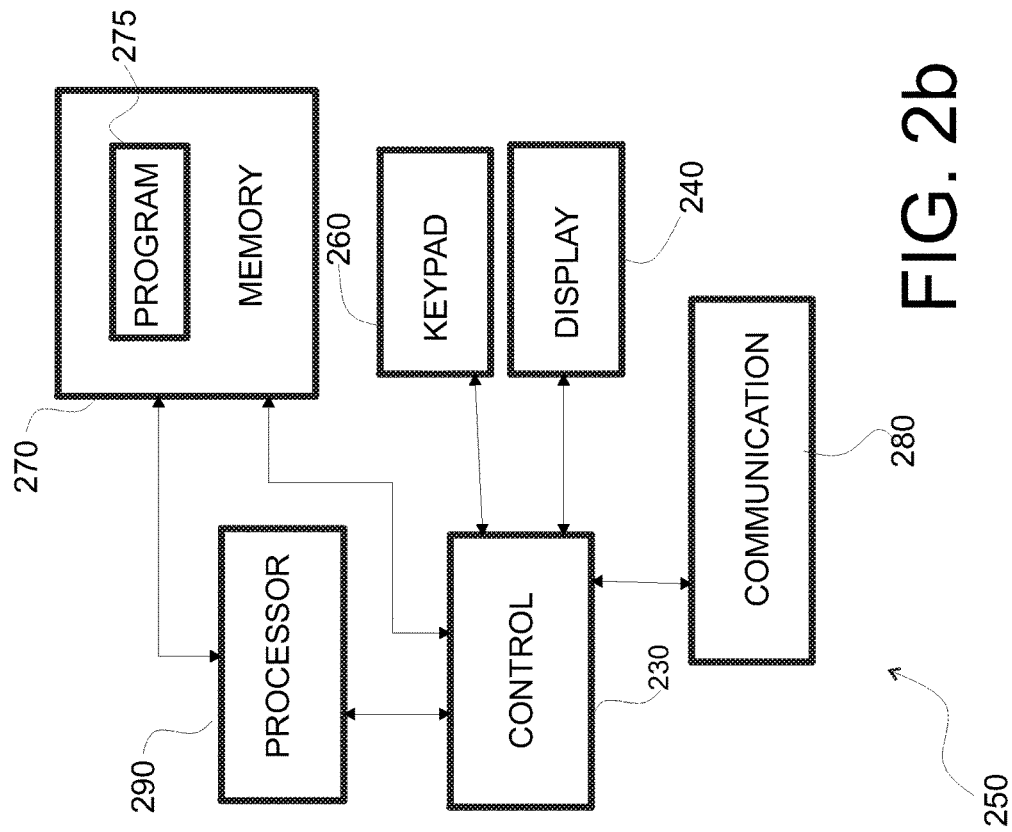
FIG. 2b shows an apparatus according to an embodiment.
Figure 2A:
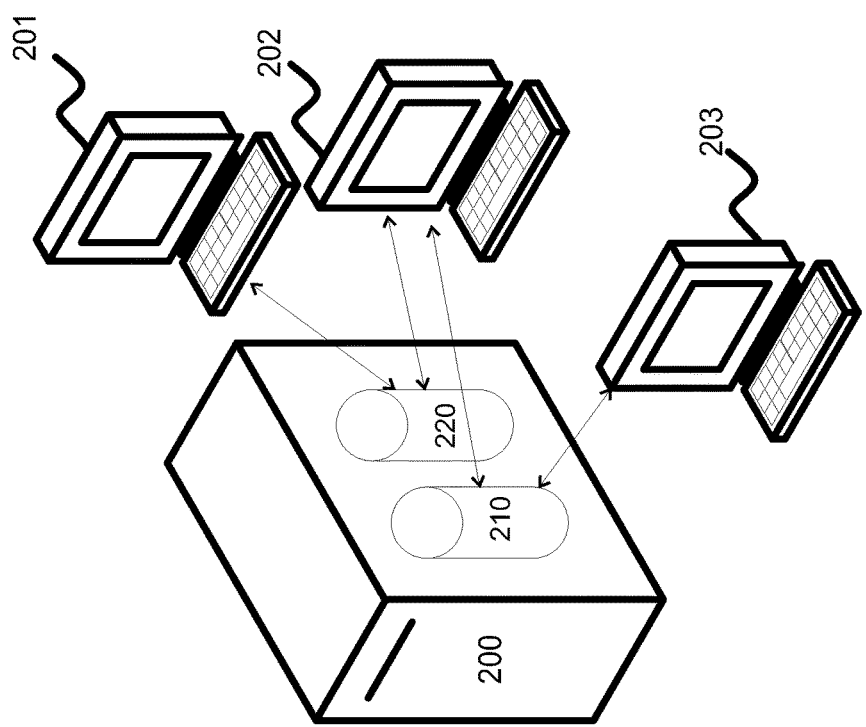
FIG. 2a shows a content management system according to an embodiment.

FIG. 2a illustrates an embodiment of a content management system. A content management system can store data either statically or dynamically. The present embodiments relate to a dynamic system.

The content management system according to the embodiment shown in FIG. 2 comprises at least one server 200 for storing electronic objects. The server may be a so called on-premise server or a cloud server or their combination. The electronic objects may be stored in one or more data vaults 210, 220. One or more client devices 201, 202, 203 can access said at least one server 200 in order to work with the stored electronic objects. For example, a client device may check-out an object, wherein a user of the client device may modify the checked-out object. After modification, the user of the client device checks the object in the vault again, wherein the object is available to other users. The client device may be a personal computer, a mobile device, a laptop, a tablet device, or any computer device. The content stored in the server is used through a data management solution provided for client devices. The data management solution may be universal for all types of client devices, or there can be client device specific data management solution for each device, e.g. a mobile data management solution, a web-based data management solution, a native data management solution. In addition, the server device 200 may have its own server-side data management solution.

An apparatus according to an embodiment is illustrated in FIG. 2b in simplified manner. The apparatus 250 may represent a server device 200 or client device 201, 202, 203 of FIG. 2a. The apparatus 250 comprises processing means, such as a processor 290 for processing data. The apparatus 250 further comprises memory means, such as a memory 270, storing computer program code 275, applications and various electronic data. The apparatus 250 comprises controlling means, such as a control unit 230, for controlling functions in the apparatus 250. The control unit 230 may run a user interface software to facilitate user control of at least some functions of the apparatus 250. The control unit 230 may also deliver a display command and a switch command to a display 240 to display visual information, e.g. a user interface. The control unit 230 may communicate with the processor 290 and can access the memory 270. Further, the apparatus 250 may comprise input means e.g. in a form of a keypad 260. Yet further, the apparatus 250 comprises various data transfer means, such as a communication block 280 having a transmitter and a receiver for connecting to a network and for sending and receiving information. The communication means can be adapted for telecommunications and/or wide-range and/or short range communication.

Figures 3A, 3B:
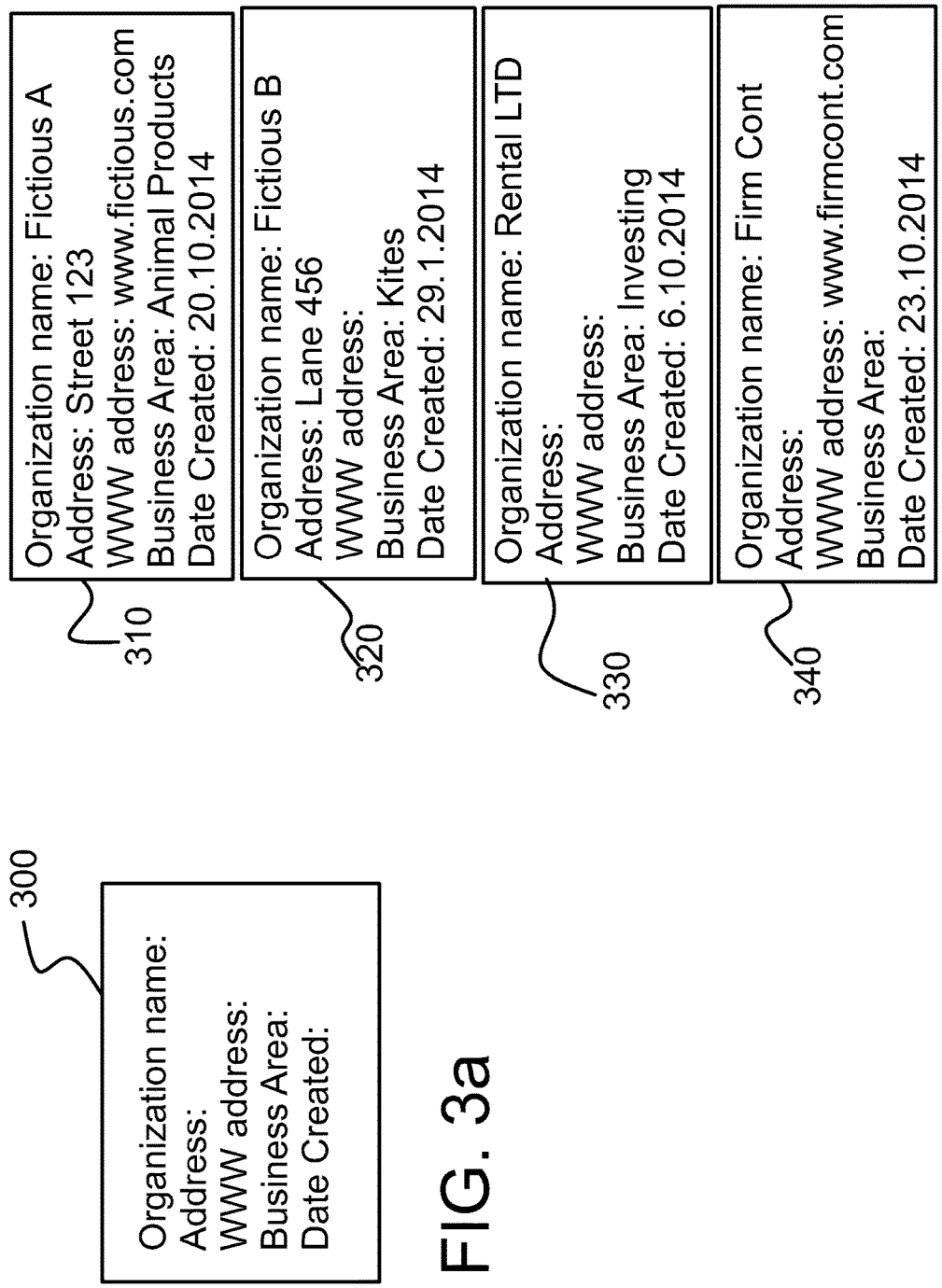
FIG. 3a shows an example of an object.
FIG. 3b shows examples of objects.

An object in a dynamic content management system, is a representation of any data. The object may have relationship with (i.e. refers to/are referred by) other objects. The dynamic content management system has a metadata structure that defines the semantics for the data. The metadata structure defines metadata for different objects as well as relationships between objects. An example of an object i is shown in FIG. 3a. In the embodiment of FIG. 3a, the type of the object is "Organization", which defines customer data. The object "Organization" comprises metadata having properties for "Organization name", "Address", "WWW address", "Business Area" and "Date Created". The properties are given values when data relating to specific customer is stored to a system comprising such object.

Let us turn back to FIG. 1. FIG. 1 shows a test vault 100 comprising a metadata structure 105. The purpose of the test vault 100 is to operate as an application provider's development platform, where content management applications and metadata structures for their need are tested and developed. The metadata structure 105 is a ready-to-be replicated metadata structure relating to a certain application, for example a content management application, such as a DMS application, a QMS application, a CRM application, etc. The metadata structure 105 has been developed and tested in the test vault 100, and when the metadata structure 105 functions correctly, it is ready to be replicated to actual application vault comprising the corresponding content management application.

When the metadata structure 105 is desired to be replicated, a first replication packet, i.e. a metadata structure packet 110, comprising the metadata structure 115 (i.e. copy of the metadata structure 105) is generated. The metadata structure is serialized as a specific XML (Extensible Markup Language) formatted file. In addition to the metadata structure 115, the first replication packet 110 may also contain some object-related data, e.g. object templates and configuration objects.

For generating the first replication packet, the test vault may comprise an object collector, a structure collector, a content exporter and a package writer. The object collector is configured to gather selected object as replicated metadata and also referenced structure elements via dependencies. The structure collector is configured to gather selected metadata structure elements as fully represented elements, and also referenced metadata structure elements via dependencies. The package writer is configured to create the first replication packet with the content exporter. An example of the first replication packet contains the data that is to be exported, i.e. metadata structure containing fully represented structure elements and referenced structure elements, and also objects and their metadata. After the first replication packet is completed, the first replication packet can be exported to the client vault.

The first replication packet 110 may be included in an application installation package comprising the corresponding content management application. The installation application package is provided (e.g. for sale, for downloading, etc.) for installation to clients.

FIG. 1 also shows a client vault 120. The client vault 120 may be one of the vaults shown in FIG. 2 with reference 210, 220. It is thus appreciated that the client vault 120 is located on a server 170 that is accessible by one or more client devices.

The client vault 120 comprises a package reader. The package reader is configured to read and parse the first replication packet.

The client vault 120 may be initially empty, wherein the content management application can be installed to the client device, and the metadata structure 115 in the first replication packet 110 can be replicated to the client vault 120. With such an installation, both the content management application and the metadata structure are configured to build the content management system for a client.

Alternatively (shown also in FIG. 1), the client vault may already comprise at least a part of a metadata structure for a certain version of content management application. In such embodiment, the metadata structure 115 in the first replication packet 110 is replicated to the client vault 120 to complete the part of the metadata structure and further to update the content management application.

Sometimes, when completing an existing metadata structure and updating a content management application, a conflict may occur. For example, the metadata structure being replicated from the first replication packet may bring such metadata elements to the client vault 120 that already exist in the client vault. It is thus possible that when the content management application is being installed, the replicated metadata structure element replaces an existing metadata structure element. As an example, a client vault comprises an existing class "Quality Guideline", having a business-related property definition "Department". The installation package, in particular the metadata structure of the first replication packet also comprises a class "Quality Guideline". However, there is no property definition "Department" in the metadata structure of the first replication packet in the installation package. However, the class "Quality Guideline" in the first replication packet comprises a compulsory property "Supervisor". Now, a mere replication of the metadata structure in the first replication packet would select either the existing class with a property definition "Department" or the replicated class having a property "Supervisor". However, this is not desired. Therefore, when the first replication packet is imported to the client vault, the metadata structure elements may be combined so that the updated metadata structure would contain a class having both properties "Department" and "Supervisor".

FIG. 1 also shows a data storage 130 comprising content. The content may comprise documents and document-related data, customers and customer-related data, process-related and/or policy-related data or any combination of the aforementioned. The content may be generated for/by an application X. The application X may be a third-party application for data management purposes. The content from the application X may be exported to the client vault 120. The exporting 3 is implemented by generating a content packet 140 being e.g. in CSV (Comma-separated values) file format. An example of a content packet is given next. In this simplified example, the content relates to customers, wherein the content packet 140 may comprise data in the form of:
Customer Name;Street address;Www address;Business area;Date Created
Fictious A;Street 123;www.fictious.com;Animal products; 20.10.2014
Fictious B;Lane 456;;Kites;29.10.2014
Rental LTD;;;Investing;6.10.2014
Firm Cont;;www.firmcont.com;;23.10.2014

It is appreciated that such content packet comprises information for customers "Fictious A", "Fictious B", "Rental LTD", "Firm Cont". The information relates to the street address, www address, business area and date created. In this example, the information is separated with semicolon ";". Therefore, the content packet in such format says—for example—that a customer having a name "Fictious A" has a street address "Street 123" and www address "www.fictious.com". The customer has as a business area "Animal products". The customer has been created to the system on "20.10.2014". The content packet 140 is transmitted to a migration tool 150.

The migration tool 150 is capable of connecting to the server 170, or may be located in the server 170. In either case, the migration tool 150 is configured to connect with the client vault 120 and perform API (Application Programming Interface) requests relating to the metadata structure of the client vault 120. The information on the metadata structure may be requested just after the content packet 140 has been received for processing. This ensures that the metadata structure information is up-to-date. Alternatively, the information on the metadata structure may have been received before the content packet 140 is received or may be received substantially at the same time with the content packet.

The migration tool 150 receives information on the metadata structure being used in the client vault 120. The information on the metadata structure comprises metadata structure elements, such as for example one or more of the following: metadata properties, access control lists, object types, classes. The migration tool 150 is configured to build an internal data model. The data model is represented as interrelated objects which internal data model relates to the received information on the metadata structure. The internal data model can be interpreted as a representation of the actual metadata structure 125. The internal data model is used with the content packet 140 in order to generate a second replication packet 160, which second replication packet 160 is suitable for the client vault 120.

In practice, the migration tool adapts the content from the content packet 140 according the internal data model. For the adaptation, the migration tool uses a separate configuration file being in XML format. The configuration file defines how data in the content packet (being in e.g. csv-format) are related to the actual metadata structure 125. The migration tool thus defines a model defining the objects that are needed in the vault. The data from the content packet 140 is stored to the XML files of the second replication packet. Similarly, a reduced version of the internal data model may be stored to the same directory.

The generated replication packet 160 comprises the content being stored as XML-files comprising a set of content-related properties. The second replication packet 160 may be saved 6 to the server 170.

The client vault 120 fetches 7, 8 content data from the second replication packet 160 to be copied to the actual metadata structure 125. It is appreciated that the content is in the form (i.e. XML format) that can be processed by the metadata structure 125 of the document vault.

In order to describe the result of the migration, let us use the object of FIG. 3a as an example. The second replication packet comprises content-related data as XML files, which content-related data is obtained from the content packet comprising data for customers "Fictious A", "Fictious B", "Rental LTD" and "Firm Cont". As a result of migration, the second replication packet comprises XML files for organizations "Fictious A", "Fictious B" "Rental LTD" and "Firm Cont". When this second replication packet is processed by the document vault, four different organization objects are created, as shown in FIG. 3b. There are an object 310 for organization "Fictious A", an object 320 for organization "Fictious B", an object 330 for organization "Rental LTD" and an object 340 for organization "Firm Cont". It is noticed that some of the properties in object 300 has a definition part different from the definition in the content packet. For example, the object 300 comprises "Organization name", whereas the data in the content packet comprises "Customer name". Similarly, the object 300 comprises "Address" whereas the data in the content packet comprises "Street address".

FIG. 4 is a flowchart illustrating a method according to an embodiment. The method comprises receiving by the migration tool a content packet from a third-party application 410; receiving by the migration tool information on the metadata structure used in the first vault 420; generating a replication packet by adapting content from the content packet according to the information on the metadata structure 430; storing the replication packet in the server 440; and replicating the objects in the replication packet to the first vault 450.

The various embodiments may provide advantages. For example, when creating content to a vault, the use of replication packets makes the content creation faster in controlled manner.

Prior to the present embodiments, a certain API has been used. Such API generates content one object at a time, which may be slow. In addition, each object created by API is monitored more closely, and in some situations, the system may even prevent the object creation. In addition, the objects being created by using API are created to the document vault immediately. However, if the creation of the last object is unsuccessful, then the whole creation process needs to be restarted from beginning and the successfully created objects need to be removed.

The present embodiments provide a solution, where first and second replication packets are created. The first replication packet comprises data on the metadata structure, and the second replication packet comprises content data in a vault-specific form. The first replication packet is transferred to the server in order to generate a metadata structure, and the second replication packet is transferred to the server that is configured to process the packet in order to store the objects to the vault. Such an operation (i.e. usage of replication packets) may prevent any slowing caused by a network break.

If the server is a cloud server, and the client vault is located in such cloud server, the files in the second replication packet can be associated as files for the client vault. In practice, the migration tool is configured to transfer object files as blob objects directly to a blob storage (i.e. a cloud service) storing the file data for the client vault. Because the object files have been converted by the migration tool to the format that is used by the application vault, the server only needs to transfer the object files from the specified blob storage container to another storage, which another storage may be used as a client vault file location. This makes the data transfer even faster, because no additional copying is needed, which further improves the performance.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is apparent that the present invention is not limited solely to the above-presented embodiments, but it can be modified within the scope of the appended claims.

The invention claimed is:

1. A method for a content management system, the content management system comprising at least a first vault in a server and a migration tool, the method comprising:
   receiving by the migration tool information on a metadata structure used in the first vault from the first vault, the metadata structure defining metadata for objects and relationships between said objects, wherein the objects relate to a first content management application;
   generating an internal data model based on the received information on the metadata structure, wherein the internal data model is represented as objects having relationships therein between;
   receiving by the migration tool a content packet from a second content management application, wherein the second content management application differs from the first content management application;
   generating a replication packet comprising the content from the content packet, wherein the content from the content packet is converted into objects having relationships therein between according to the internal data model in a format used in the first content management application, wherein the conversion is performed by using a separate configuration file of Extensible Markup Language-format, said separate configuration file being stored in the generated replication packet;
   storing the replication packet in the server; and
   processing the replication packet to generate objects to the metadata structure of the first vault and to store the objects and their relationships to other objects virtually in the first vault to be used by the first content management application.

2. The method according to claim 1, wherein the replication packet is a second replication packet, wherein the method comprises receiving a first replication packet for replicating a metadata structure for the first vault.

3. The method according to claim 2, wherein the information on the metadata structure relates to the metadata structure being replicated by the first replication packet.

4. The method according to claim 1, wherein the server is a cloud server.

5. An apparatus comprising at least one processor, memory including computer program code, the memory and the computer program code configured to, with the at least one processor, cause the apparatus to perform at least the following:
   receiving information on a metadata structure used in the first vault from the first vault, the metadata structure defining metadata for objects and relationships between said objects, wherein the objects relate to a first content management application;
   generating an internal data model based on the received information on the metadata structure, wherein the internal data model is represented as objects having relationships therein between;
   receiving a content packet from a second content management application, wherein the second content management application differs from the first content management application;

generating a replication packet comprising the content from the content packet wherein the content from the content packet is converted into objects having relationships therein between according to the internal data model in a format used in the first content management application, wherein the conversion is performed by using a separate configuration file of Extensible Markup Language-format, said separate configuration file being stored in the generated replication packet;

storing the replication packet in the server; and processing the replication packet to generate objects to the metadata structure of the first vault and to store the objects and their relationships to other objects virtually and with reference to other objects in the first vault to be used by the first content management application.

6. The apparatus according to claim 5, wherein the replication packet is a second replication packet, in which the information on the metadata structure relates to a metadata structure being obtained from a first replication packet for replicating a metadata structure for the first vault.

7. The apparatus according to claim 5, wherein the server is a cloud server.

8. A computer program product embodied on a non-transitory computer readable medium, comprising computer program code configured to, when executed on at least one processor, cause an apparatus or a system to:

receive information on a metadata structure used in the first vault from the first vault, the metadata structure defining metadata for objects and relationships between said objects, wherein the objects relate to a first content management application;

generate an internal data model based on the received information on the metadata structure, wherein the internal data model is represented as objects having relationships therein between;

receive a content packet from a second content management application, wherein the second content management application differs from the first content management application;

generate a replication packet comprising content from the content packet wherein the content from the content packet is converted into objects having relationships therein between according to the internal data model in a format used in the first content management application, wherein the conversion is performed by using a separate configuration file of Extensible Markup Language-format, said separate configuration file being stored in the generated replication packet;

store the replication packet in the server; and processing the replication packet to generate objects to the metadata structure of the first vault and to store the objects and their relationships to other objects virtually and with reference to other objects in the first vault to be used by the first content management application.

9. A content management system comprising a first vault in a server and a migration tool, the server comprising at least one processor and memory including computer program code, the memory and the computer program code configured to, with the at least one processor, cause the system to perform at least the following:

receiving by the migration tool information on a metadata structure used in the first vault from the first vault, the metadata structure defining metadata for objects and relationships between said objects, wherein the objects relate to a first content management application;

generating an internal data model based on the received information on the metadata structure, wherein the internal data model is represented as objects having relationships therein between;

receiving by the migration tool a content packet form a second content management application, wherein the second content management application differs from the first content management application;

generating a replication packet comprising content from the content packet wherein the content from the content packet is converted into objects having relationships therein between according to the internal data model in a format used in the first content management application, wherein the conversion is performed by using a separate configuration file of Extensible Markup Language-format, said separate configuration file being stored in the generated replication packet;

storing the replication packet in the server; and processing the replication packet to generate objects to the metadata structure of the first vault according to the metadata structure and to store the objects and their relationships to other objects virtually and with reference to other objects in the first vault to be used by the first content management application.

10. The content management system according to claim 9, wherein the replication packet is a second replication packet, wherein the content management system further comprises computer program to cause the content management system to receive a first replication packet for replicating a metadata structure for the first vault.

* * * * *